No. 770,824.

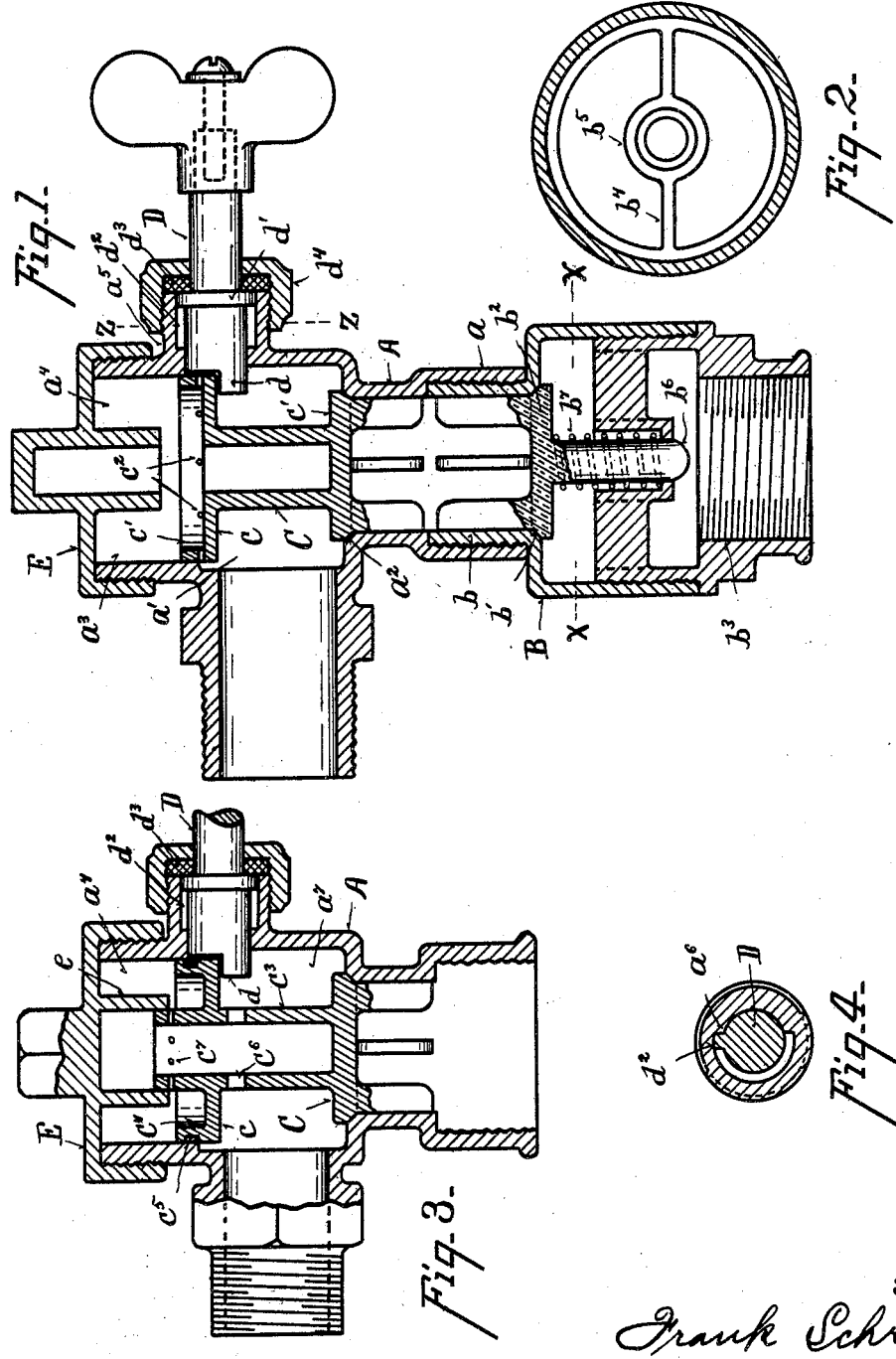

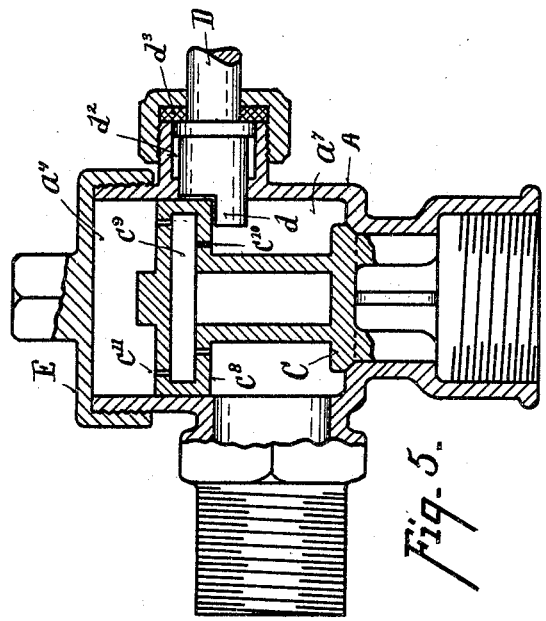
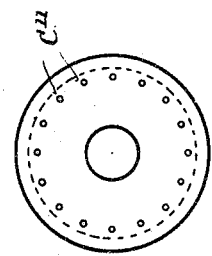
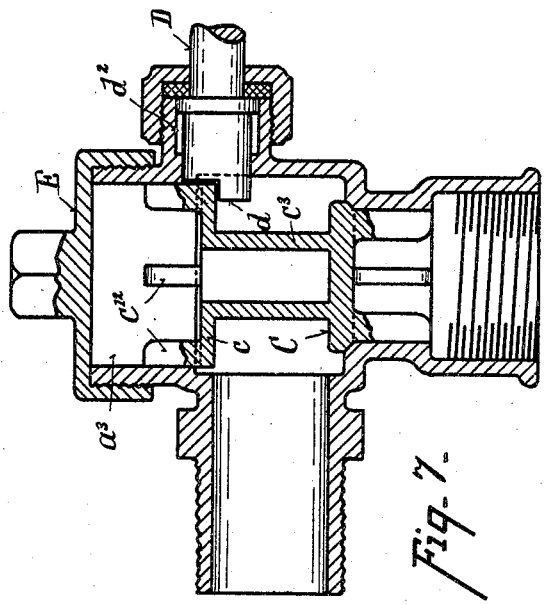
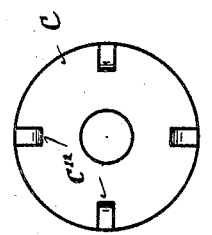

Patented September 27, 1904.

UNITED STATES PATENT OFFICE.

FRANK SCHREIDT, OF MANSFIELD, OHIO.

RELIEF-VALVE.

SPECIFICATION forming part of Letters Patent No. 770,824, dated September 27, 1904.

Application filed November 9, 1903. Serial No. 180,348. (No model.)

*To all whom it may concern:*

Be it known that I, FRANK SCHREIDT, a citizen of the United States of America, and a resident of Mansfield, county of Richland, State of Ohio, have invented certain new and useful Improvements in Relief-Valves, of which the following is a specification.

The object of my invention is to improve the valve for which Letters Patent No. 702,157 were issued to me by the United States upon June 10, 1902, so as to render it more efficient in action and cheaper in construction.

I have illustrated several modifications of my improvements in the accompanying drawings, in which—

Figure 1 is a central sectional view of a valve, showing my improvements in the main valve, the auxiliary valve, and the hand-stem for actuating the main valve. Fig. 2 is a horizontal sectional view taken on line $x\,x$ of Fig. 1. Figs. 3, 5, and 7 are sectional views similar to Fig. 1 of modifications of the main valve. Fig. 4 is a vertical sectional view on line $z\,z$ of Fig. 1. Fig. 6 is a plan view of the main valve shown in Fig. 5. Fig. 8 is a similar view of the main valve shown in Fig. 7.

I will describe first the improvements made in the auxiliary valve, since these are the same in all the modifications.

I have screw-threaded the outlet-opening $a$ of the main valve A interiorly, and into this screw-threaded extension $a$ I engage the upper exteriorly-screw-threaded extension $b$ of the auxiliary casing B, which is formed with an annular seat $b'$ at the base of the extension $b$. Against seat $b'$ the auxiliary valve $b^2$ seats. The lower end of valve-casing B is interiorly screw-threaded, and into it is fitted a coupling $b^3$, which has at its upper end a cross-bar $b^4$, which supports a bearing $b^5$ for the valve-stem $b^6$, which is surrounded by a coiled spring $b^7$. The advantage of the construction of the auxiliary valve is that it enables me to make the outlet-opening of the main valve A of a size to be readily coupled to pipes, so that if it be not desired to use the auxiliary valve, as in cases where the engine is not a vacuum-engine, the auxiliary valve may be readily omitted and the main valve may be coupled up to the pipes without any changes.

In the modification of the main valve shown in Fig. 1 the interior of the valve-casing is enlarged at $a'$. The main valve C has above its enlarged disk $c$ an upwardly-projecting annular flange $c'$, at the base of which are made a series of perforations $c^2$ in a position such that when the valve rests upon its seat $a^2$ the perforations $c^2$ come immediately below the upper reduced portion $a^3$ of the interior of the valve-casing and that as soon as the valve has been raised from its seat the flange $c'$ is carried up into the reduced portion $a^3$ and the perforations are closed thereby. These perforations $c^2$ are made small, so that while steam passes through them readily into the chamber $a^4$ above disk $c$ water will not pass through them readily, but is throttled by reason of their diminutive size, so that as soon as water is carried into the valve-casing A underneath the flange $c$ it is quickly carried upward, so that no water enters the chamber $a^4$, and that as soon as the water has been discharged from the valve and the pressure below the disk $c$ has been reduced the steam remaining in the chamber $a^4$ will carry the main valve to its seat.

The valve-casing A has upon its side an annular boss $a^5$ and a perforation through which projects the end of hand-stem D beneath the disk $c$. This hand-stem projects inward a distance such that the end of the cam $d$ comes in vertical alinement above the lower end $c'$ of the main valve, so that should it be desired to remove the main valve C from the valve-casing this may be done by taking off the cap E without removing the hand-stem D, since the lower end $c'$ in removing the valve would not interfere with the end $d$. Boss $a^5$ has upon its interior an inwardly-projecting lug $a^6$, which extends partly around the circumference of the boss. Stem D has a longitudinal lug $d^2$, which contacts the lug $a^6$, so as to limit the rotation of the stem in both directions. When the lug $d^2$ is in its lowermost position, the cam $d$ has raised the valve C thoroughly from its seat. The longitudinal lug $a^5$ likewise contacts the exterior wall of the casing in order to limit the distance the stem D may extend into the interior of the casing. Valve-stem D has likewise a collar $d'$, which stands flush with the outer edge of the boss $a^5$ and about which is placed a packing $d^3$, which is held in place by a flanged nut $d^4$. By making the stem project beneath the flange $c$ I avoid making two flanges on the valve, as shown in my aforesaid patents.

Referring to Fig. 3, the main valve C has its central tubular stem $c^3$ extended upwardly above the flange $c^4$ and projecting into a downwardly-projecting annular flange $e$ of the cap. The flange $c^4$ has seated in it a packing-ring $c^5$. The tubular stem $c^3$ has below the flange $c$ perforations $c^6$ and above the flange and immediately beneath the lower end of the annular flange $e$ when the valve is seated a series of contracted perforations $c^7$. These perforations are made of a size such that when the valve is seated steam passes freely into the chamber $a^4$, but water would be throttled thereby. As soon as water enters the main body $a^7$ and comes in contact with the disk $c$ the valve is raised and the perforations $c^7$ are covered by the extension $e$.

In Fig. 5 the enlarged cylindrical end $c^8$ of the main valve C has formed in it a chamber $c^9$, in the lower wall of which are a series of perforations $c^{10}$ and in the upper wall of which are a series of perforations $c^{11}$, both sets of perforations being contracted, so as to allow a free passage of steam, but to throttle water. Should any water get into the chamber $c^9$, it would not have sufficient pressure to get through the perforations $c^{11}$ into the chamber $a^4$. As soon as the valve is raised by the pressure of water underneath the cylinder $c^8$ the water would flow out of the main body $a^7$, and if any water happened to get into the chamber $c^9$ it would likewise be discharged therefrom.

In the modification shown in Fig. 7 the disk $c$ is placed on the stem $c^3$ in a position such that when the valve is seated it stands below the contracted portion $a^3$ a very small distance such that the opening while allowing steam to pass would throttle water. Upon disk $c$ are placed a series of upwardly-projecting wings $c^{12}$.

What I claim is—

1. In a relief-valve the combination of a valve-casing having an inlet and an outlet opening, a main valve closing the outlet-opening and having an enlarged portion at the end opposite the outlet-opening contacting the walls of the valve-casing and forming a chamber therewith, and located between the chamber and the body of the valve-casing a series of passages contracted to a size such as to allow steam therethrough but to throttle the flow of liquids therethrough substantially as shown and described.

2. A valve-casing having an inlet and an outlet opening, a valve to close the outlet-opening and having an enlarged portion contacting the walls of the casing and forming a chamber within the valve-casing at the opposite end of the valve from the seat, and a series of passages leading into the chamber and in a position such that when the valve is seated they are open, and when the valve is raised they are closed substantially as shown and described.

3. A valve-casing having an inlet and an outlet opening and an upper contracted portion, a valve seated against the outlet-opening and having an enlarged portion to contact the contracted portion of the valve-casing and forming therewith a chamber, perforations in the valve leading into the chamber and standing below the contracted portion of the valve-casing when the valve is seated and to be carried into and to be closed by the contracted portion when the valve is raised.

4. The combination of a valve-casing having an inlet-opening and an interiorly-screw-threaded extension forming an outlet-opening, a main valve in the casing seated against the outlet-opening, an auxiliary valve-casing having an exteriorly-screw-threaded extension to fit into the outlet extension of the main valve and an auxiliary valve seated upwardly against the extension of the auxiliary casing substantially as shown and described.

5. The combination of a valve-casing having an inlet and an outlet opening, a main valve seated against the outlet-opening and having an enlarged flange contacting the walls of the casing and forming therewith a chamber at the end opposite the outlet-opening, passages for placing the chamber in communication with the body of the valve-casing when the valve is seated and a hand-stem projecting through the valve-casing beneath the flange substantially as shown and described.

FRANK SCHREIDT.

Witnesses:
F. H. BOGARDUS,
CHAS. E. SCHREIDT.